United States Patent Office 3,403,096
Patented Sept. 24, 1968

3,403,096
METHOD AND DEVICE FOR SEPARATION OF A SUSPENSION
Svatopluk Mackrle, Brno, Vladimír Mackrle, Prague, and Oldřich Dračka, Vladimír Selzer, and Bohumír Halámek, Brno, Czechoslovakia, assignors to Ceskoslovenská akademie věd, Prague, Czechoslovakia, a corporation of Czechoslovakia
Filed Sept. 24, 1964, Ser. No. 398,956
Claims priority, application Czechoslovakia, Oct. 2, 1963, 5,385/63; Oct. 3, 1963, 5,418/63
3 Claims. (Cl. 210—20)

ABSTRACT OF THE DISCLOSURE

A device for water treatment in which sludge blanket and clarified water zones of a clarifier are located above filtration, expansion and underdrainage zones of a rapid filter, resulting in a single compact unit.

---

Figure 1:
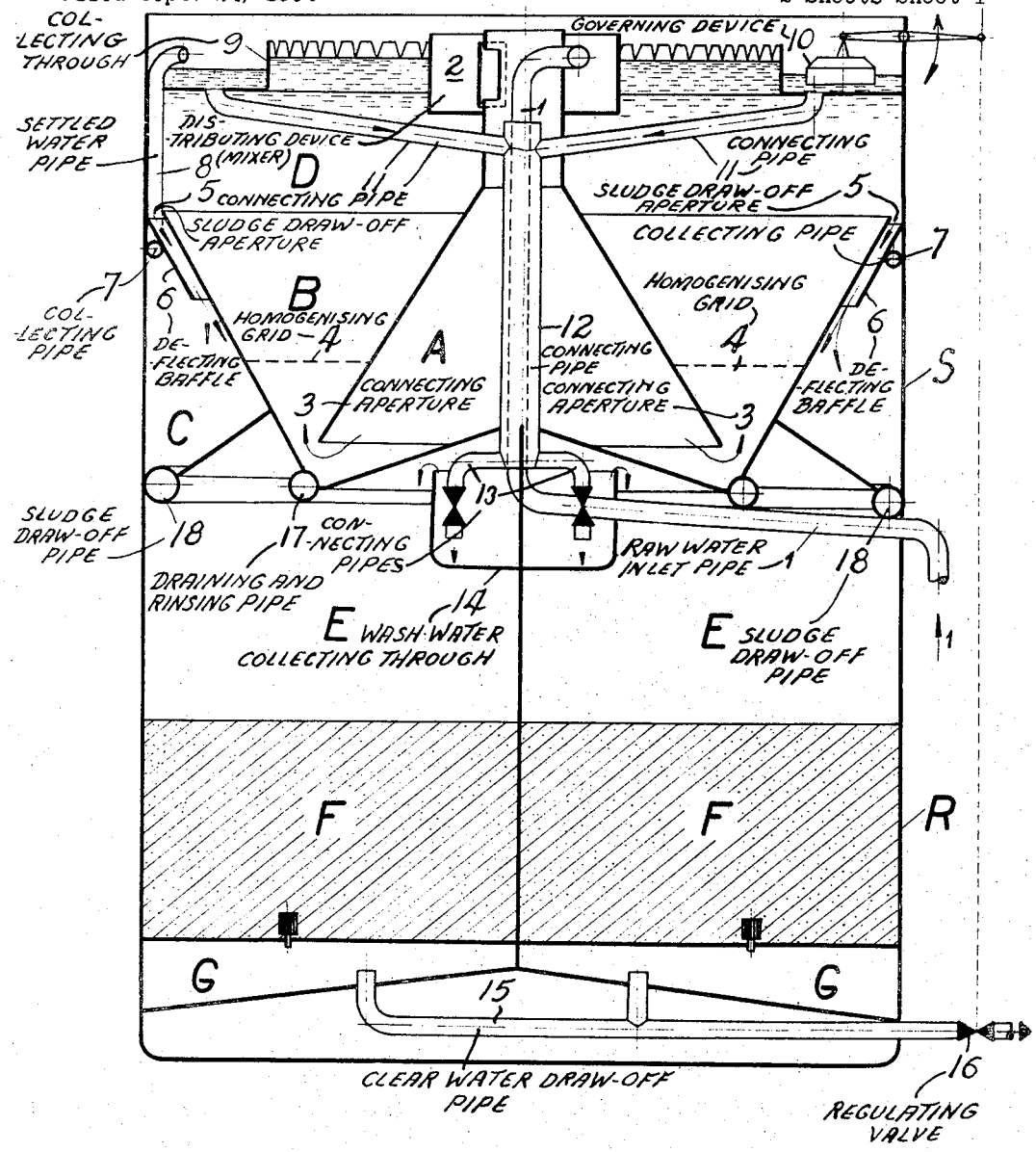

In the treatment of water by means of a sludge blanket and rapid filter, the sludge blanket clarifier and the rapid filter have so far been adjacent separate units, the water from the sludge blanket flowing onto the separate rapid filter. The functioning of a rapid filter requires a certain pressure, which may be in the case of a gravity filter the result of the head of water above the surface of the filter, or in the case of a pressure filter the result of a pumping device.

The gravity rapid filter comprises four functional zones: a clarified water zone, expansion zone, filtration zone, and underdrainage zone. The filtration zone comprises a filtration bed of granular material (sand, anthracite etc.) through which the water is filtered. The suspension in the water is arrested in the pores of the filter bed. The volume of pores in the filter bed is called the sludge capacity of the filter bed. The ratio of the volume of suspension arrested in the filter bed at the end of a filtration cycle to the pore volume in the clean filter represents the pore space utilization of the filter bed. The underdrainage zone is located below the filter bed and serves to collect the filtrate during filtration and to distribute the wash-water during backwashing. The expansion zone is located above the filter bed and provides the space for the necessary expansion during back-washing of the filter. The clarified water zone of the rapid filter is located above the expansion zone and serves to produce the hydrostatic pressure required for the proper functioning of the gravity filter. At the boundary between the expansion zone and the clarified water zone is located a collecting trough or similar device, which serves to draw off the wash water during backwashing. For a pressure filter the clarified water zone is eliminated, the expansion zone is enclosed, and pressure is applied by means of a pumping device. The necessary provision of a sufficient pressure for the proper functioning of the filter results from the fact that as clogging proceeds during filtration, the head loss across the filter increases. Because most of the suspension is arrested in the upper layers of the filter bed, the loss of head is large even when the pore space utilization is low. For efficient use of the pore space in the filter bed, a sufficiently high pressure is therefore required.

Gravity filters are easier to construct and operate than pressure filters, but have the disadvantage that the provision of a sufficiently high hydrostatic pressure necessitates the use of a large volume for the clarified water zone (sometimes up to 50% of the total volume of the rapid filter). Pressure filters could, indeed, be small, but their construction and operation causes complications which are so pronounced that their use is obviated except in special circumstances.

In the usual concept of water treatment plant consisting of a separate clarifier and rapid filter where clarified water from the clarifier flows on to the gravity filter, the hydrostatic pressure of the water at the filter bed is a function of the height of the water in the clarifier.

In previous designs of clarifiers, their height was sufficient to provide the necessary hydrostatic pressure at the filters, situated separately along side the clarifier. Current research into the principles governing the operation of the sludge blanket separation process allows a substantial reduction in the height of the clarifiers relative to those of earlier design. On the contrary, a high pore space utilization demands the provision of a sufficiently high hydrostatic pressure at the filter bed. These two opposing trends make it impossible to utilize the improvements in water treatment technology in the design of new plants.

The main feature of our invention is that the sludge blanket and clarified water zones of the clarifier are located above the filtration, expansion and underdrainage zones of the rapid filter, resulting in a single compact unit. By this means, all the advantages of pressure and gravity filters are combined and their disadvantages eliminated.

The accompanying drawing shows in diagrammatic representations exemplary embodiments of the present invention.

Figure 2:
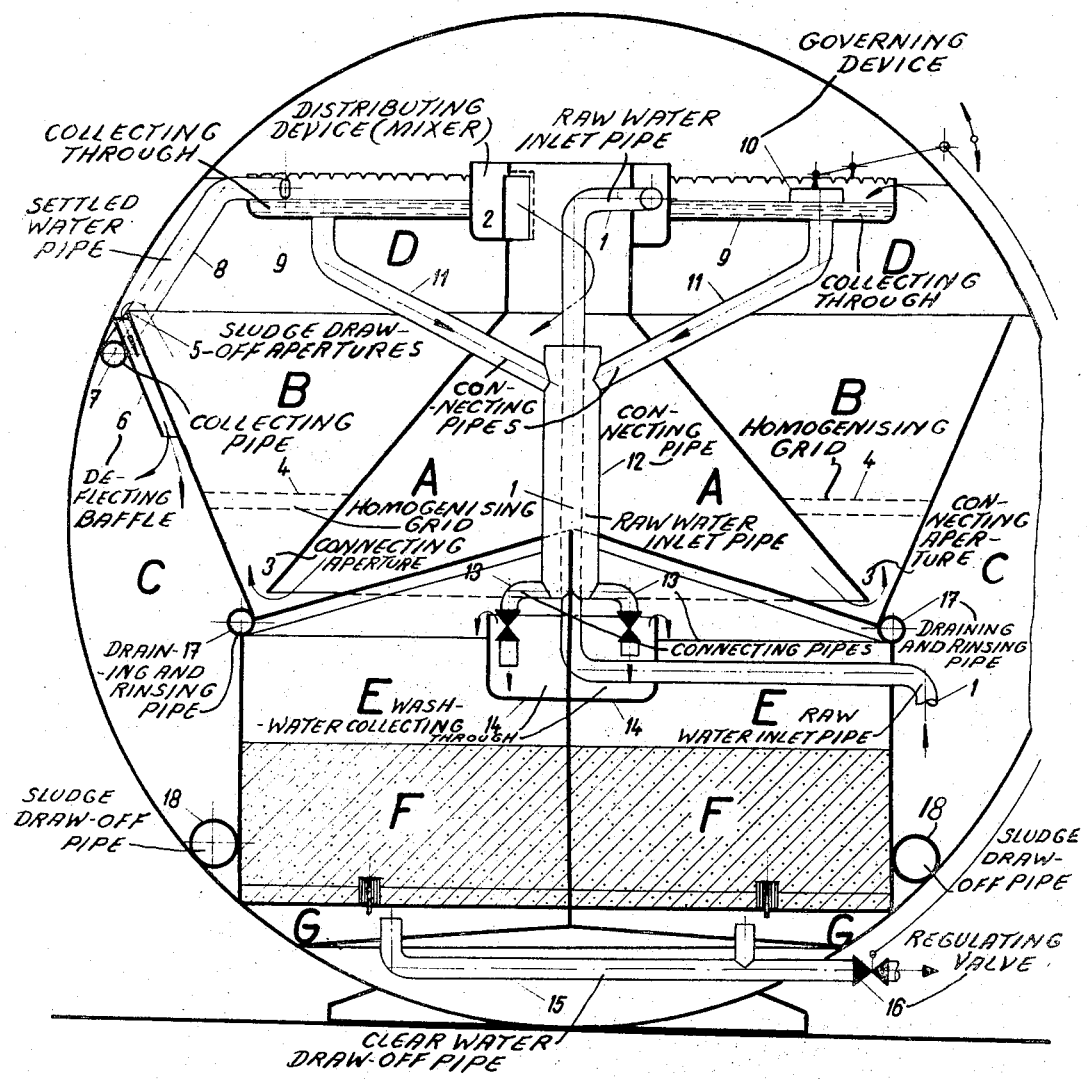

FIGURE 1, shows an example of a device according to our invention in a vertical section, and FIGURE 2, shows another example of a device according to our invention in a vertical section.

The device for separation of a suspension as shown in FIGURE 1, comprises a rapid filter R, with a sludge blanket clarifier S located above the filter R. The clarifier consists of a coagulation zone A, sludge blanket zone B, sludge collecting zone C, and clarified water zone D. The rapid filter is divided into three zones: an expansion zone E, filtration zone F, and underdrainage zone G. An influent pipe 1, protrudes into the coagulation zone A, where a distributing system 2, is located. The coagulation zone A is connected with the sludge blanket zone B by connecting apertures 3. Homogenizing grids 4 are located in zone B. Sludge draw-off apertures 5, connect the upper part of the sludge blanket zone B, with the sludge collecting zone C, where a deflecting baffle 6, and a settled water collecting pipe 7, are located. In the upper part of the clarified water zone D, is located a collecting trough 9, which is connected to the expansion zone E by connecting pipes 11, 12, and 13. Into the same collecting trough 9, protrudes a settled water pipe 8, leading from the settled water collecting pipe 7. Governing device 10, is also located in the collecting trough 9, for regulating its water level. In the upper part of the expansion zone E is the wash-water collecting trough 14. From the underdrainage zone G, emanates a clear water draw-off pipe 15, provided with a regulating valve 16, controlled by the governing device 10. In the coagulation zone A, under the connecting apertures 3, a draining and rinsing pipe 17, is located. The sludge collecting zone C, is provided with a sludge draw-off pipe 18.

The device described in FIGURE 1, functions in the following manner: The chemically dosed water enters through the influent pipe 1, and distributing device 2, into the coagulation zone A, in which coagulation occurs.

The water flows from this zone A, into the sludge blanket zone B, through the connecting apertures 3. In the sludge blanket the bulk of suspension formed by coagulation is retained. The clarified water flows through the sludge blanket zone B, to the clarified water zone D, where it overflows into the collecting trough 9, whence it flows through the connecting pipes 11, 12, and 13, into the expansion zone E. Water containing an excess of flocculated particles is sucked from the sludge blanket zone B, through the sludge draw-off apertures 5, and contrained by the deflecting baffle 6, to flow into the sludge collecting zone C. The settled water from this zone is collected by the settled water collecting pipe 7, and flows along the settled water pipe 8, into the same collecting trough 9. The clarified water from the expansion zone E, flows through the granular filter bed of the filtration zone F, into the underdrainage zone G, from where it is drawn off through pipe 15. The rate of flow through pipe 15, is regulated by means of the valve 16, and governing device 10, in such a way that the water level in the collecting trough 9, remains constant. The hydrostatic pressure under which the rapid filter operates is obtained by the head of water of the combined height of sludge blanket zone B, clarified water zone D, and expansion zone E. The backwash water is collected in the wash water collecting trough 14. The pipe 17, is used for draining the coagulation and sludge blanket zones and for rinsing the connecting apertures 3. The concentrated sludge from the sludge collecting zone C, is drawn off by the sludge draw-off pipe 18.

Despite its difference in shape, the device for separation of a suspension as shown in FIGURE 2, comprises the same functional zones A, B, C, D, E, F, G, as that shown in FIGURE 1. These functional zones are formed by suitable partitioning of a vessel of circular vertical cross section, and the sludge collecting zone C, is in this case located between the outer wall of the vessel on one side and the sludge blanket zone B, expansion zone E, and filtration zone F, on the other. The numerical notation in FIGURE 2, has the same significance as that in FIGURE 1.

The device shown in FIGURE 2, operates in the same manner as the modification shown in FIGURE 1.

The advantages of our invention may be enumerated as follows: By locating the sludge blanket zone and clarified water zone of the clarifier above the gravity filter whose clarified water zone is omitted, both clarification by filtration through the sludge blanket and filtration through the granular filter bed is obtained in a single compact housing by means of which one technological unit suffices in place of the two normally incorporated in the design of such plant.

What we claim is:
1. A method for water treatment in a single vessel utilizing a fully fluidized sludge blanket zone, a sludge blanket clarifier zone, an expansion zone, and a rapid filter zone containing a granular filter bed, comprising the steps of:
(a) coagulating the impurities in the water to obtain a suspension;
(b) separating said suspension from the water first, in said fully fluidized sludge blanket zone, second, forming a sediment of the excess sludge blanket in a separate closed zone, and third, separation in said granular filter bed of said rapid filter zone;
(c) using a pressure for filtration through said granular filter bed, which is obtained by the head of water of the combined height of said expansion zone and said sludge blanket clarifier; and
(d) regulating a constant water level in said rapid filter zone in dependence of the output of said sludge blanket clarifier zone.

2. A device for water treatment in a single vessel, comprising:
(a) a rapid filter in the lower part of said vessel, said filter containing a granular filter bed, an underdrainage zone beneath and an expansion zone above said filter,
(b) a sludge blanket clarifier having an upwardly extending conical wal located in the upper part of said vessel and having at its center a conical wall tapering to the top and forming a coagulation zone,
(c) said conical wall of said sludge blanket clarifier forming a connecting aperture means with said coagulation zone, the open upper edge of said sludge blanket clarifier nearing the wall of said single vessel and forming a sludge draw-off aperture means,
(d) a sludge collecting zone occupying the space between said single vessel and said sludge blanket clarifier having at its lower end a sludge draw-off pipe means and at its upper end a deflecting baffle means leading to said sludge draw-off aperture means, and collecting pipe means leading into a collecting trough means, and
(e) a clarified water zone above said sludge blanket zone containing said collecting trough means and being connected with said expansion zone, and a governing means for controlling the output of said rapid filter.

3. In a device for water treatment as defined in claim 2, wherein the horizontal cross section of said single vessel is the shape of a conical section.

References Cited
UNITED STATES PATENTS

| | | | |
|---|---|---|---|
| 2,860,786 | 11/1958 | Kittredge | 210—207 |
| 2,948,400 | 8/1960 | Hagen | 210—256 |
| 2,969,149 | 1/1961 | Mackrle et al. | 210—195 |

MICHAEL E. ROGERS, *Primary Examiner.*